June 10, 1969     K. KAISER     3,449,713
DISPLAY APPARATUS FOR VTOL-AIRCRAFT
Filed April 28, 1967
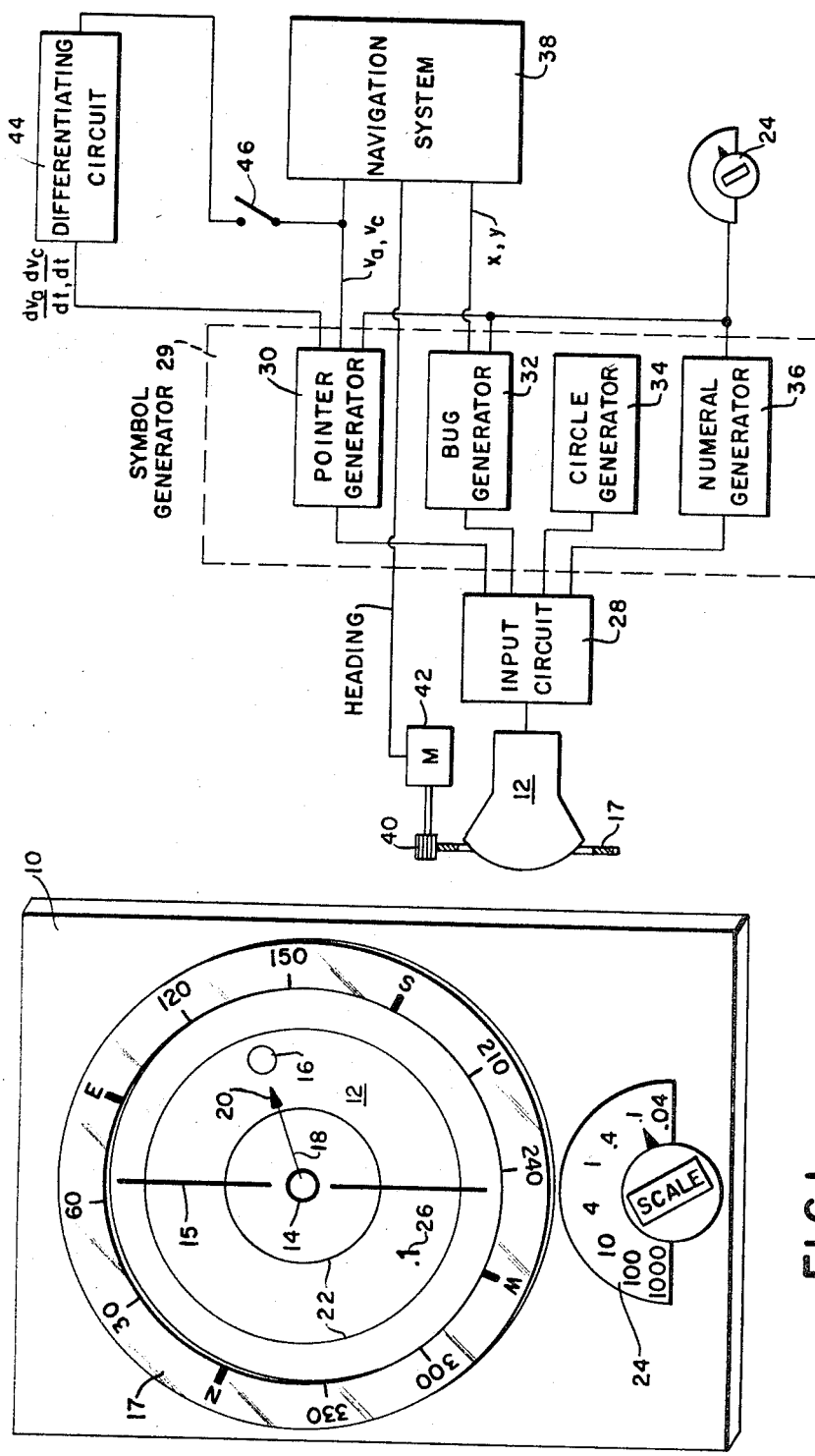
INVENTOR
Kurt Kaiser
BY *Spencer & Kaye*
ATTORNEYS

United States Patent Office 3,449,713
Patented June 10, 1969

3,449,713
DISPLAY APPARATUS FOR VTOL-AIRCRAFT
Kurt Kaiser, Heidelberg, Germany, assignor to
TELDIX Luftfahrt-Ausrustungs G.m.b.H.
Filed Apr. 28, 1967, Ser. No. 634,588
Claims priority, application Germany, Apr. 28, 1966,
T 31,012
Int. Cl. G01g 5/00
U.S. Cl. 340—27                                    6 Claims

ABSTRACT OF THE DISCLOSURE

A display apparatus for the pilot of a VTOL-aircraft, where a line is formed whose direction represents the horizontal direction of travel of the craft and whose length is a function of the horizontal speed of the craft. This display, which also gives a pictorial representation of the relative position of the craft and the landing site, makes it easier for the pilot to bring the craft in for a precision landing.

BACKGROUND OF THE INVENTION

The invention relates to a display apparatus which is intended primarily for use with so-called VTOL-aircraft, namely, aircraft capable of vertical take-offs and landings and for helicopters. The display apparatus is based on conventional equipment in which the position of the craft relative to the position of the landing site is displayed to the pilot, in a map-like manner.

During the last phase of the landing immediately prior to the vertical descent to the landing site, the VTOL-aircraft is flying in a condition known as "hovering." That is to say; the weight of the craft is no longer supported by conventional aerodynamic lifting forces, instead, the entire weight of the craft is carried by several downwardly directed forces, such as is produced by downwardly directed jet engines. The craft is provided with a level control system which sees to it that the lifting forces acting at various points are properly balanced with respect to each other so that the craft will not tip over and so that the sum of all of the lifting forces is equal to the weight of the craft. The behavior of a thus-hovering VTOL-aircraft, insofar as its horizontal travel is concerned, is thus comparable to the horizontal movement of an object sliding over a frictionless surface.

One way of controlling horizontal travel of the hovering craft is by intentionally decreasing one or the other of the supporting forces, as a result of which the craft will be slightly tilted so that there will develop a horizontal component, this being known as thrust modulation. In the course of this horizontal movement, the positions of the power plants are not changed with respect to the craft.

Another way of controlling the horizontal travel of a hovering craft is by means of horizontal vernier nozzles which are fed with some of the air tapped from the power plants producing the vertical forces.

It will be appreciated from the above that the horizontal movement control of a hovering VTOL-aircraft is a pure "acceleration" control, which is a phenomenon not generally encountered under other terrestrial conditions, due to the inevitable effects of gravity and friction. Moving the control stick results in acceleration—sometimes nonuniform acceleration—in the direction in which the stick is moved. This, then, means that as long as the stick is out of its neutral position, the craft will continue to accelerate in the direction in which the stick is deflected. When the stick is returned to its neutral position, the craft will maintain its horizontal speed.

Experience has shown that, under instrument conditions, i.e. under "blind-flying" conditions when the pilot, be it due to atmospheric conditions or to the orientation of the craft, has no visual outside reference, if the pilot has available to him only a map-like presentation showing his own position with respect to that of the landing site, this will not suffice to enable the pilot to bring the craft directly above the touch-down point, the reason for this being that simply seeing the symbol or "bug" representing the landing site move, in two dimensions, relative to the "bug" representing the craft will not enable the pilot to steer his craft with the necessary degree of accuracy. Added to this is the fact that the pilot must also concern himself with his altitude above the touch-down point, which complicates matters even further. On the other hand, to effect a safe landing, it is essential that the pilot bring the craft directly over the touch-down point—which, in practice, is often very small indeed. Here, the problem of excess fuel consumption must also be taken into consideration in that the pilot must see to it that the hovering and landing phases—during which enormous quantities of fuel are burned—are completed before the fuel on board is exhausted. Just as important is the requirement that the horizontal speed be reduced to zero, at least just before touchdown, because the landing gear of a VTOL-craft is generally not designed to allow for any appreciable amount of across track horizontal movement of the craft on the ground, to say nothing of the obvious dangers if the landing site is surrounded by obstructions.

SUMMARY OF THE INVENTION

It is, therefore, the primary object of the present invention to provide assistance to the pilot of a VTOL-aircraft during the critical hovering phase, and, with this object in view, there is provided a display apparatus for giving landing information to the pilot of a VTOL-aircraft. According to the present invention, the apparatus comprises display means which form a pictorial representation of the relative positions of the craft and of a landing site, and means for producing on this display means a line, which may, if desired, terminate in an arrow head, the direction of which line on the display means represents the horizontal direction of travel of the craft and the length of which line is a function of the horizontal speed of the craft.

BRIEF DESCRIPTION OF THE DRAWINGS

FIGURE 1 is a front view of the display apparatus, showing bugs representing the positions of the craft and of the landing site as well as the line which represents the direction and speed of travel of the craft.

FIGURE 2 is a block diagram showing a system for producing the display illustrated in FIGURE 1.

DESCRIPTION OF THE PREFERRED EMBODIMENTS

Referring now to the drawings and first to FIGURE 1 thereof, the same shows a display apparatus 10 mounted on the instrument panel of the aircraft. The apparatus incorporates a cathode ray tube 12 on which is displayed a bug 14, located at the center of the image screen of the cathode ray tube and representing the position of the craft, and a bug 16 which represents the position of the landing site relative to the craft. Since the bug 14 representing the craft remains in the center of the screen, the bug 16 representing the landing site will move relative to the bug 14 as the craft moves horizontally relative to the landing site.

Further a vertical lubber line 15 is fixed on the screen or displayed in a fixed relation to the screen. And a compass card 17 in form of a transparent ring which may rotate about the screen constitutes together with the lubber line a well known heading indicator. It may expressly be stated, that the landing site and—as will be shown—the horizontal speed is displayed in a coordinate system, which is fixed in the aircraft. For example if the craft turns to the left about the yaw axis without any travel speed, which is possible in the hovering phase, then the landing site bug 16 on the display screen accordingly moves circularly to right about the aircraft bug 14.

According to the present invention, there is also displayed on the screen a line 18 emanating from the bug 14 and pointing in the direction in which the craft is moving; in FIGURE 1, the line 18 is shown as pointing in a direction of 135°. The display shows the craft as actually moving toward the landing site. The line 18 may, for ease of interpretation, be provided with an arrow head 20 so that the line will be more readily identified as a pointer.

The horizontal acceleration control system is to be understood as accelerating the craft in the direction, in which the control stick is moved. Therefore and in consequence of the speed coordinate system being fixed to the aircraft, the pointer, which is growing out of the bug 14 upon a movement of the control stick, will point in the direction of the stick movement, if the screen of the cathode ray tube is thought as lying in a horizontal plane.

Yet another characteristic of the line 18 is that its length is a function of the horizontal speed of the craft. For example, the length of the line may be directly proportional to the velocity of the craft, i.e., the longer the line, the faster will the craft be shown as traveling toward the landing site.

As a result of the two characteristics of the pointer 18, 20, it becomes quite simple for the pilot of the craft to reduce the horizontal speed of the craft to zero at the instant at which the bug 16 comes to coincide with the bug 14. The pilot will do this by moving the stick in the opposite direction; e.g., if the craft continues to move, from the position shown in FIGURE 1, in a direction of 135° until the bugs 14 and 16 overlap, the pilot need only move the stick backward and to the left, i.e., in a direction of 315°. In this way, the pilot causes the craft to accelerate in a direction opposite to its direction of travel, i.e., the craft is decelerated until the horizontal velocity is zero.

It will thus be appreciated that when the pilot has the above-described display available to him, it will be easy for him to reduce the speed of the craft to zero the instant the craft is precisely over the touch-down point. The reason for this, seen from the biotechnological point of view, is that the pilot will control the stick primarily in response to the information given to him from the length of the pointer, namely, the speed of the craft, and only secondarily will the pilot be concerned with the absolute distance of the touch-down point from the craft. Expressed mathematically, the invention reduces the response-mechanism of the pilot by one order of magnitude: heretofore the pilot had to react in a way to produce the necessary deceleration only on the basis of knowing the distance of the touch-down point from the craft, whereas, thanks to the present invention, the pilot has given to him an indication of his speed relative to the target. That is to say, with the help of the present invention the pilot can calculate the deceleration $a$ on the basis of a speed $v$ ($a=dv/dt$), whereas heretofore he had to calculate the deceleration $a$ on the basis of a distance $s$ ($a=d^2s/dt^2$). The practical significance of this is that the complexity of making precision landings in VTOL-aircraft is reduced to the point where it becomes humanly manageable and therefore practical Under certain circumstances, it is desirable to let the length of the pointer 18, 20, be a function not only of the horizontal speed but also a function of the rate of change of speed, i.e., the acceleration. This may be necessary when the movement of the control stick and the horizontal acceleration produced thereby are not linearly proportional to each other. In that case, the length of the pointer 18, 20, is affected by a factor which itself is a function of the control and flying characteristics of the craft in which the apparatus is installed.

Under certain circumstances, it may be desirable to let the line 18 emanate not from the bug 14 representing the craft but from the bug 16 representing the target.

FIGURE 1 also shows range circles, as well as a range selector 24, by means of which the actual distance represented by the range circles may be adjusted. Also shown on the screen of the cathode ray tube, at 26, is a numeral indicating the particular scale represented by the range circles. In FIGURE 1, the range selector is at ".1," this being the radius, in nautical miles, of the larger of the two range circles, the inner range circle being half as large as the outer one. The numeral ".1," as well as the bugs 14, 16, the pointer 18, 20, and the range circles 22 are written on the screen of the cathode ray tube by the electron beam.

As the bug 16 approaches the bug 14, the pilot will switch the range selector to the next-lower range, .04, whereupon the bug 16 will jump radially further away from the bug 14 and the sensitivity of the speed measuring device is increased, i.e., the pointer 18, 20 will suddenly become longer.

FIGURE 2 is a block diagram showing the electronic means for producing the display illustrated in FIG. 1. FIGURE 2 again shows the cathode ray tube 12, to whose deflection plates (not shown) are applied signals which produce the information being displayed on the screen of the tube by way of an input circuit 28, which in turn receives signals from a symbol generator 29. The symbol generator consists of several generator units, which will cause the input circuit 28 to produce on the screen of the cathode ray tube their respective symbols, namely a pointer generator 30 for the pointer 18, 20, a bug generator 32 for the movable bug 16 representing the landing site, a circle generator 34 for the range circles 22, and a numeral generator 36 for the numeral 26 indicating the particular scale.

Inputs of the pointer generator 30 and of the bug generator 32 are connected to a navigation system 38, which itself may be a ground-independent navigation system, such as an inertial guidance device, a Doppler radar system or a dead-reckoning system, or a ground-dependent system, such as a radio system utilizing conventional VOR-DME (very-high frequency omni-range and distance measuring equipment), which may be implemented with a transponder carried aboard the craft. By each of these connections between the navigation system and the generator units 30 and 32 are applied to the respective unit two components of the horizontal speed and the horizontal distance to the landing site, the components forming a right angle between them and being in a fixed relation to the aircraft. That is to say, to the pointer generator 30 are applied the forward speed signal $v_a$, measured along the roll axis, and the lateral speed signal $v_c$, measured across the roll axis, and to the bug generator 32 are applied the forward distance signal $x$, measured along the roll axis, and the lateral distance signal $y$, measured across the roll axis of the aircraft.

FIGURE 2 also shows the compass card 17 and the range selector 24 shown in FIG. 1. The compass card is driven by a pinion 40, fixed to the shaft of a servomotor 42. This servomotor receives a heading signal from the navigation system. A (dash lined) mechanical connection is shown between the range selector 24 and the generator units 30, 32 and 36, whereby these three generator units are switched over when a new range is selected, so that e.g. the next-lower numeral 26 is displayed, the landing site bug 16 jumps outwardly and the pointer 18, 20 enlarges.

If, as described above, it is desired that the length of the line 18 also be a function of the rate of change of horizontal speed, the system will include a differentiating circuit 44 which receives its input via a selectively operable switch 46 from the speed channel between the navigation system 38 and the pointer generator 30. As indicated in FIG. 2, since the outputs $v_a$ and $v_c$ of the navigation system are functions of the forward speed and of the lateral speed respectively, the outputs of the differentiating circuit 44 will be signals which are functions of the forward acceleration $dv_a/dt$ and of the lateral acceleration $dv_c/dt$. These outputs are also connected with the pointer generator 30 for being mixed with the respective speed signals in order to "quicken" the pointer display.

The individual components incorporated in the above-described circuit arrangements are conventional; see, for example, NTC, 1963, No. 6 "Ein Vergleich verschiedener Darstellungen alpha-numerischer Zeichen auf Kathodenstrahlroehren" (a comparison between various display techniques of alphanumeric characters on cathode ray tubes) by H. Groll; Teldix Koordinate, Nachrichten fuer Betriebsangehoerige der Teldix Luftfahrt-Ausruestungs G.m.b.H., Heidelberg, Germany, vol. 15, March 1967, "RADI, der elektronische Symbolgenerator fuer Analogrechner" (RADI, the electronic symbol generator for analog computers); and Journal of the American Rocket Society, vol. 14, December 1957, "Doppler Radar for Guidance Design Techniques and Performance," by W. R. Fried. Copies of the above, the partial translations of the first-mentioned publication, are of record in the file of the present application.

It will be understood that the above description of the present invention is susceptible to various modifications, changes, and adaptations, and the same are intended to be comprehended within the meaning and range of equivalents of the appended claims.

I claim:
1. Apparatus for giving landing information to the pilot of a VTOL-aircraft and comprising, in combination:
   (a) display means forming a pictorial representation of the relative positions of the craft and of a landing site; and
   (b) means for producing on said display means a line whose direction on said display means represents the horizontal direction of travel of the craft and whose length is a function of the horizontal speed of the craft.

2. Apparatus as defined in claim 1 wherein said line emanates from the pictorial representation of one of said positions.

3. Apparatus as defined in claim 1 wherein said line emanates from the pictorial representation showing the position of the craft.

4. Apparatus as defined in claim 1 wherein the length of said line is also a function of the rate of change of the horizontal speed of the craft.

5. Apparatus as defined in claim 1 wherein one end of said line emanates from the pictorial representation showing the position of the craft, there being an arrow head at the other end of said line.

6. Apparatus as defined in claim 1 wherein said display means comprise a cathode ray tube, and said means for producing said line on said display means comprise an input circuit connected to said cathode ray tube and means connected to said input circuit for applying thereto signals which are functions of the horizontal direction of travel of the craft and of the horizontal speed of the craft.

References Cited
UNITED STATES PATENTS 3,152,248 10/1964 Deschamps _____ 235—150.22
3,355,733 11/1967 Mitchell et al. _ 235—150.22 XR RODNEY D. BENNETT, JR., *Primary Examiner.*

C. L. WHITHAM, *Assistant Examiner.*

U.S. Cl. X.R.

235—150.22; 343—5